April 27, 1965   B. W. MOLLER   3,180,510
TRAILER-GARAGE FOR GOLF BUGGIES
Filed June 3, 1963
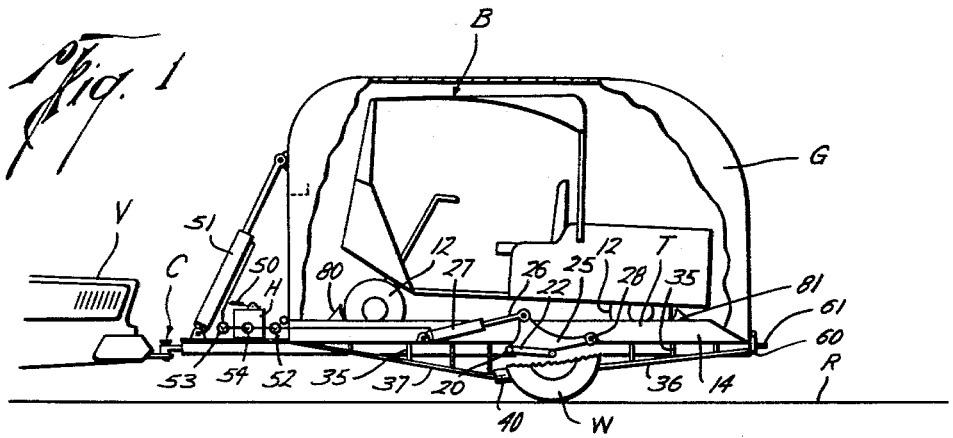
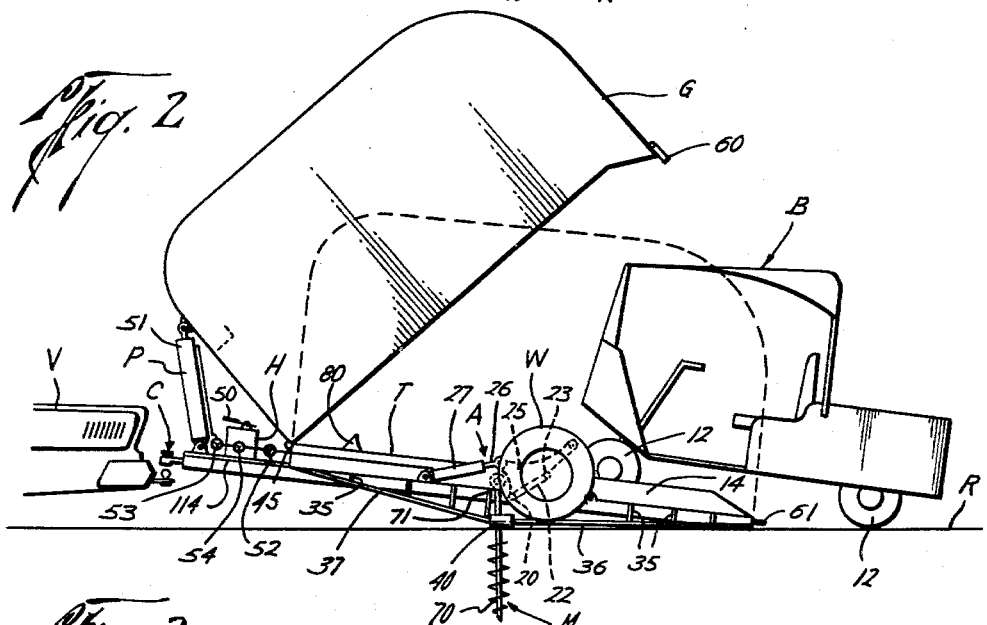
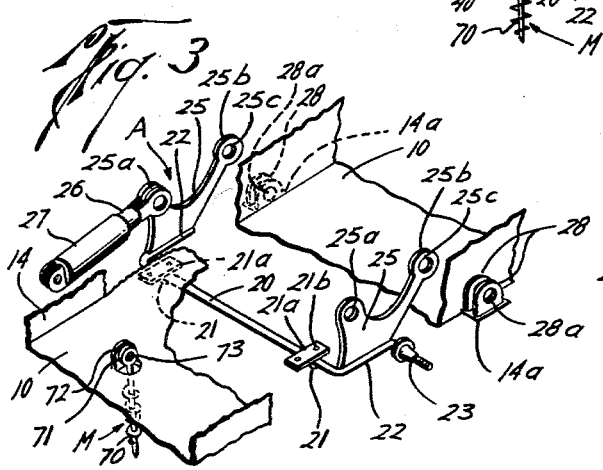
Bynum W. Moller
INVENTOR.
BY Hayden & Pravel
ATTORNEYS 3,180,510
TRAILER-GARAGE FOR GOLF BUGGIES
Bynum W. Moller, P.O. Box 3631, Victoria, Tex.
Filed June 3, 1963, Ser. No. 285,018
3 Claims. (Cl. 214—506)

This invention relates to a trailer-garage for golf buggies, and particularly to one having retractable wheels.

It has become quite common for golfers to use golf buggies or carts, which are either electrically or gasoline-engine powered. Many people would prefer to have their own golf buggies or carts, but have refrained from such ownership because of the difficulties of transporting and storing the golf buggy with equipment heretofore known.

It is an object of this invention to provide a new and improved construction for the transportation and storage of golf buggies or carts.

An important object of this invention is to provide a new and improved trailer-garage for golf buggies having retractable wheels whereby said wheels are extended for the transportation of a golf buggy and are retracted when the trailer-garage is serving as a stationary cover or garage for the golf buggy.

Another object of this invention is to provide a new and improved trailer-garage having retractable wheels and a pivotally mounted garage cover, with means for raising and lowering same.

A further object of this invention is to provide a new and improved trailer-garage for a golf buggy having means for anchoring same in a fixed position when serving as a garage, and also having a releasable cover adapted to be locked over the golf buggy to thereby prevent theft or inadvertent removal of the trailer-garage or the buggy therein.

A particular object of this invention is to provide a trailer-garage for a golf buggy wherein a trailer hitch is provided for detachably connecting the trailer-garage to an automobile or other vehicle, and wherein lateral rollers are provided to facilitate a swinging of the trailer-garage into position for connecting the hitch to the vehicle.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a view in elevation with certain portions broken away, illustrating the trailer-garage of this invention in its transportation position and having a golf buggy or cart positioned therein;

FIG. 2 is an elevation of the apparatus of this invention in its garage position, but with the garage cover raised as shown in the solid lines for loading or unloading of the golf buggy from the trailer-garage; and FIG. 3 is a fragmentary isometric view illustrating in particular the preferred mechanism of this invention for raising and lowering the trailer body with respect to the trailer wheels to shift the trailer-garage of this invention to and from the transportation and garage positions.

In the drawings, the letter T designates generally the trailer body of the trailer-garage of this invention. A garage cover G which together with the trailer body T forms a garage when the cover G is in the closed position (FIG. 1), is pivotally connected to such trailer body T for the raising and lowering of the cover G with respect to the trailer body T. The trailer body T has retractable wheels W mounted thereon on each side of the trailer body T for pivotal movement to raise and lower the trailer body T to and from the transportation position and the garage position. As will be more evident hereinafter, the trailer-garage of this invention is adapted to transport and store a golf buggy or cart B one type of which is illustrated in FIGS. 1 and 2. When the buggy B is within the trailer-garage as shown in FIG. 1, such buggy B may then be transported over the road or highway R, preferably by connecting same to an automobile or vehicle V, the rear portion of which is illustrated in FIGS. 1 and 2.

The trailer body T as illustrated in the drawings preferably is formed with a platform 10 which is adapted to receive the wheels 12 of the golf buggy or cart B. The platform 10 preferably has vertically extending sides 14 formed integrally with the platform 10 or welded or otherwise affixed thereto. The sides 14 are spaced a sufficient distance apart to allow the rear wheels 12 of the golf buggy B to be positioned on the platform 10 between such sides 14.

For mounting the wheels W on the trailer body T for retracting and exposing same, and for thereby also raising and lowering the trailer body T with respect to the road or ground R, an actuating mechanism designated generally with the letter A is provided. Such apparatus A is shown in its preferred form in the drawings, particularly FIG. 3 wherein a pivoted axle or shaft 20 is shown mounted in pillow block bearings 21 which are suitably attached to the lower side of the platform 10 by welding or screws or other suitable means. As shown in FIG. 3, each of the pillow blocks 21 has a base plate 21a with openings 21b for receiving suitable bolts or rivets which also extend through the platform 10 (not shown). At each end of the axle or shaft 20 it is bent or offset to provide an offset extension 22, each of which has a stub shaft or axle 23 integrally formed therewith or suitably connected thereto by any known connecting means. Each of the stub shafts or axles 23 is adapted to receive one of the wheels W for pivotal movement eccentrically with respect to the shaft 20 as it is rotated or pivoted in the pillow block bearings 21.

In order to transmit pivotal movement to the wheels W, through the rotation of the shaft or axle 20, each offset extension 22 has a control plate 25 welded or otherwise affixed thereto. A connecting eye 25a is provided at the forward portion of the plate 25 for connecting with the piston stem 26 of a hydraulic cylinder 27, or other suitable actuating means, as will be more fully explained hereinafter. Each plate 25 also has a rearward connecting bracket 25b which has an eye 25c, each of which is adapted to be moved into alignment with one or more upstanding locking flanges or brackets 28 which are welded or otherwise secured externally of the sides 14, preferably on side-extension plates 14a. Each of the flanges or brackets 28 has a suitable opening 28a therethrough which are adapted to be aligned with the openings 25c when the wheels W are in their lowered or transportation position (FIG. 1). A locking pin or pins are preferably inserted through the openings 25c and 28a for each of the bracket plates 25 to lock the wheels W in their lowered position of FIG. 1 to thereby relieve the load on the hydraulic assembly 26, 27 during the transportation use of the apparatus of this invention, as will be more evident hereinafter.

The trailer body T is preferably provided with a framework underneath the platform 10 which may consist of a plurality of interconnected rods or bars 35 extending vertically and other rods or bars 36 and 37 extending longitudinally. In the construction illustrated in the drawings, there are two of the longitudinally extending rods or bars 36 of the frame-work which are preferably positioned immediately below the sides 14 and at the rear portion of the trailer body T. The frame-work rods or bars 36 extend parallel to the ground or road R when the trailer body T is in the garage position or the position for loading and unloading the buggy B from the apparatus. When the frame support bars 36 are on the ground R, the platform or bed 10 of the trailer body D extends forwardly and upwardly with respect to the ground R as best seen in FIG. 2.

The forward ends of the support bars 36 are connected to frame members 37 which also extend longitudinally but at an upward angle with respect to the bars 36 as seen in FIGS. 1 and 2. It is to be noted that the bars 36 and 37 preferably are welded or otherwise connected together at a point in proximity to the wheels W, thereby forming the lowest point of the frame-work in the vicinity of such wheels W. The bars 36 and 37 rise upwardly from such connection point and therefore when the trailer-garage of this invention is pulled through a ditch or low spot in the road, the framework underneath the trailer body T does not catch on such ditch or interfere with the movement of the apparatus therethrough.

At the forward end of the trailer body T, a forward platform extension 114 is provided for holding the actuating equipment as will be more fully explained, including a hydraulic pump and reservoir H, as well as an actuating assembly P for providing suitable power for controlling the raising and lowering of the garage cover G. At the forward end of the auxiliary platform 114, a trailer hitch or connector C of any conventional construction is provided for making the connection to the vehicle V. The vehicle V may be an automobile, the rear end of which is illustrated in FIGS. 1 and 2, or it may be any other type of suitable pulling vehicle.

In order to facilitate the connecting of the trailer hitch or connector C between the vehicle V and the trailer body T, longitudinally extending rollers 40 are provided on the rails or support bars 36. Such rollers 40 are preferably disposed at the forward ends of the rails 36 in proximity to the wheels W and they permit lateral or swinging movement of the entire trailer-garage assembly of this invention so as to align the part of the trailer hitch C which is attached to the trailer body T with the other part of the trailer hitch which is attached to the vehicle V.

As previously pointed out, the garage cover G is adapted to pivot to and from the closed or lowered position shown in solid lines in FIG. 1 and dotted lines in FIG. 2 to a raised or opened position shown in solid lines in FIG. 2. The pivotal connection is preferably provided by a hinge 45 at the lower forward portion of the cover G and the trailer body T. The garage cover G may be formed of metal, plastic or other suitable water repellent and weather resistant material which is capable of protecting the buggy B both during the storage and during the transportation thereof. Suitable reinforcing or strengthening of the garage cover G may be provided as will be understood by those skilled in the art, for suitable strengthening and rigidifying of the entire cover G in the event it is subjected to excessive wind forces or other external loads.

The hydraulic system P is preferably the structure used for raising the garage cover G by pivoting it about its hinge means 45. The garage cover G is normally lowered by gravity due to its own weight, but such lowering may be controlled by a control of the flow of the hydraulic fluid within the actuating means P, as will be understood by those skilled in the art.

It is preferred to provide a common hydraulic pump H which may be hand operated by a suitable hand lever 50 or it may be electrically operated with a battery operated motor or other suitable power means. In any event, the hydraulic system H includes a reservoir and pump of conventional construction which is interconnected with both the cylinder 27 of the actuating assembly A and the cylinder 51 of the actuating assembly P. A valve 52 is connected in the hydraulic line leading to the hydraulic assembly A and another suitable valve 53 is connected in the hydraulic line leading to the cylinder 51 from the hydraulic pump and reservoir H. A relief valve 54 is interconnected with the reservoir and pump H and also the hydraulic lines leading to the assemblies P and A.

When the garage cover G is in its lower position, a lock hasp 60 is interengaged with a lock bracket 61 so that a usual type of lock may be connected through the bracket 61 to prevent an opening of the garage cover G until the lock is released or removed.

In order to prevent a theft of the trailer-garage of this invention, an anchoring means M is provided (FIGS. 2 and 3) which is attached internally of the trailer body T above the platform 10 so that when the garage cover G is locked to the trailer body T, the connection of the means M is inaccessible to someone outside of the garage cover G. Also, the anchoring means M prevents any movement or shifting of the trailer-garage when it is in the garage position, which might otherwise occur due to the strong winds or inadvertent pushing thereof.

The anchoring means M consists of a longitudinal auger 70 which is adapted to be rotated and screwed into the ground where the trailer-garage is parked. The upper end of the auger 70 is provided with an eye or loop 71 which is adapted to be positioned opposite to an upstanding connecting bracket 72 so that a locking pin 73 extending through the loop or eye 71 and the bracket 72 securely attaches the trailer body T to the anchoring means M. Since the connecting pin 73 is accessible only in the area above the platform 10, it will be appreciated that someone would have to have access to the interior of the garage cover G in order to remove such pin 73. It will be understood also that the anchoring means M is used only when the trailer-garage is to be parked, and it is normally removed prior to making the connection with the trailer hitch C to the vehicle V.

In the operation or use of the trailer-garage of this invention, the golf buggy or cart B is stored with the trailer-garage in the garage position. Such garage position is indicated in FIG. 2 by the dotted line showing of the garage cover G. Thus, when the trailer-garage of this invention is in the garage position, the wheels W are retracted as shown in FIG. 2 so that the trailer body T is inclined upwardly and forwardly as shown in FIG. 2, with the rods 36 resting upon the ground or other support R. The anchoring means M is secured in position prior to the placing of the cover G in its dotted line position of FIG. 2 so that movement of the trailer body T is thus prevented until the anchoring means M is released. The golf buggy or cart B is completely under the garage cover G and it is closed to the position shown in dotted lines in FIG. 2 and in solid lines in FIG. 1. It is to be noted that the buggy B is preferably positioned so that the front wheel 12 is in engagement with a fixed stop 80 which is secured to the trailer body T at the forward end thereof. Also, in order to prevent rearward shifting of the buggy B, both while in the garage position and in the transportation position, a removable stop block 81 at the rear wheels 12 is normally provided. Such block 81 is removed during the loading and unloading of the golf buggy B from the trailer-garage of this invention.

Due to the weight load being distributed to the rear more than to the forward portion of the trailer body T, the trailer body T assumes the position shown in FIG. 2 when in the garage or fixed position. Thus, when it is desired to shift the trailer-garage to the transportation position, the anchoring means M is first disconnected and then the wheels W are raised, or rather a force is applied to such wheels to actually lift the trailer body T to a substantially horizontal position as shown in FIG. 1.

In order to initially reach the upper connecting pin 73 of the attaching means M, it is necessary to release the lock connecting the lock elements 60 and 61 and then the garage cover G is raised by pumping hydraulic fluid with the hydraulic pump and reservoir H through the open valve 53 into the cylinder 51. During such pumping movement, the valve 52 is closed and also the relief valve 54 is closed. When the garage cover G has been raised sufficiently for access to the removable pin 73, the upward raising of the garage cover G is stopped by closing the valve 53 or ceasing the pumping with the pump handle 50 of the hydraulic pump H. The anchoring means M may be actually lifted or screwed out of the ground, or in some cases, it may be screwed further into the ground and left in place for a subsequent use. In any event, the upper end of the anchoring auger which includes the loop 71 is moved sufficiently so that it does not interfere with forward or rearward movement of the trailer body T. Thereafter, the cover G is lowered to the dotted line position of FIG. 2. This is accomplished by opening the relief valve 54 and the valve 53 which returns the fluid from the cylinder 51 back into the reservoir connected with the pump and reservoir H. The extent or speed of the lowering of the cover G may be thus controlled by controlling the flow of the hydraulic fluid back to the reservoir H.

After the cover G is again in the lowered position (FIG. 1), the trailer hitch C is aligned by laterally shifting the entire assembly until the upper portion of the trailer hitch C is over the lower portion on the vehicle V. The wheels W are then caused to move to their exposed position (FIG. 1) from their retracted position (FIG. 2) by the actuating assembly A. Such actuating assembly A is preferably supplied with hydraulic fluid from the hydraulic pump and reservoir H by closing the valves 53 and 54 and opening the valve 52. When the fluid from the hydraulic pump and reservoir H is provided, normally by pumping with the handle 50, the piston rod 26 moves outwardly due to the force of the fluid pressure within the cylinder 27 and causes a movement of the plate 25 attached thereto, as previously described. It will be understood of course that there are two of such cylinders 27 in the preferred form of the invention so that both of the plates 25 are moved by the movement of the piston rods 26 when fluid is introduced into the cylinders 27. The movement of the piston rods 26 from the position shown in FIG. 2 continues until the plates 25 reach the position shown in FIG. 1 at which time the brackets 25b are positioned for engagement with the upstanding flanges or brackets 28, and then a suitable pin is inserted through the eyes 28a and 25c to lock the brackets 25 to the frame of the trailer body T. The hydraulic fluid acting within the cylinder 27 may then be released to remove the load from the actuating assembly A. The trailer hitch C may be connected before, during, or after the wheels W are shifted to their exposed or lowered position while raising the trailer body T.

With the trailer hitch C connected to the vehicle V, and with the garage cover G over the buggy B on the trailer body T, and with the blocks 80 and 81 in position, the trailer-garage and the buggy B therein may be moved over the road or highway to any suitable location, usually to and from the home and the golf course.

When it is desired to remove the golf buggy B from the trailer-garage of this invention for the playing of golf at the golf course, the pins connecting the brackets 25b and 28 are released, and the fluid in the piston cylinder 27 is allowed to return to the reservoir in the pump and reservoir H. The control of the returning fluid from the cylinder 27 thus controls the rate at which the wheels W are permitted to retract. During such lowering, the valve 53 is closed, and the valves 52 and 54 are open so that the fluid in the cylinder 27 returns through the valve 54 into the reservoir in the pump and reservoir H. The retraction of the wheels W accomplishes a lowering of the trailer body T to the inclined position shown in FIG. 2, but with the trailer hitch C attached if desired. Then, the garage cover G is raised from the dotted line position of FIG. 2 to the position shown in solid lines in FIG. 2 by the actuating assembly P. This actuating assembly P works as previously described by hydraulic fluid introduced from the pump H when the valve 53 is open, causing an actual pulling downwardly on a piston within the cylinder 51 to swing the garage cover G about the hinge 45 to its raised position shown in solid lines in FIG. 2. Then, the removable block 81 is removed and the buggy B may be started with its own power and backed from the trailer body T. If the golf buggy is not equipped with a reverse, the angle of the trailer bed will cause the buggy to roll out by the force of gravity.

After the golfer has finished playing his round of golf, he may then return to the trailer garage and the golf buggy B is driven up on the trailer body T until the front wheels 12 hit the block 80. The golf buggy B normally has its own brake which holds it in such position, and then the block 81 is positioned for safety behind the rear wheels 12. The garage cover G is then allowed to lower by gravity by the opening of the relief valve 54 so as to return the hydraulic fluid from the cylinder 51 to the reservoir in the pump-reservoir H. After the buggy B has thus been enclosed by the cover G, the trailer body T and the cover G thereon are raised as a unit by the actuating assembly A which pushes on the plates 25 as previously described to expose the wheels W to the position shown in FIG. 1. The trailer-garage may then be returned to the home of the golfer and there disconnected and placed in a position for serving as a garage until the next use. The anchoring means M is then usually applied to securely hold the entire assembly in a fixed and safe position against theft.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A trailer-garage for a golf buggy, comprising:
   (a) a trailer body adapted to receive a golf buggy thereon,
   (b) a garage cover pivotally mounted on said trailer body and adapted to cover the golf buggy when it is on the trailer,
   (c) retractable wheels on said trailer body for moving said body from a garage position in contact with the ground to a transportation position above the ground, and
   (d) anchor means having its upper end connected to the upper side of said trailer body and covered by the garage cover when the cover is in the closed position, the lower end of the anchor means extending into the ground for securely holding the trailer-garage in its garage position to prevent theft or inadvertent movement of the trailer-garage.

2. A trailer-garage for a golf buggy, comprising:
   (a) a trailer body adapted to receive a golf buggy thereon,
   (b) a garage cover mounted on said trailer and adapted to cover the golf buggy when it is on the trailer,
   (c) pivotal connection means at the forward end of said garage cover connecting the cover to the trailer body for pivotal movement to an open position to permit entry of the golf buggy onto the rear of the trailer body underneath the garage cover,
   (d) retractable wheels on said trailer body for moving said body from an inclined loading position with the wheels retracted to a transportation position with the wheels lowered relative to the body,
   (e) a lower framework underneath the rear portion of the trailer body which is substantially parallel to the ground when the trailer body is in the inclined position and which rests upon the ground to provide support for the trailer body in the inclined position.
   (f) said wheels being positioned on said trailer body rearwardly of the forward portion of said framework to stabilize the trailer body in its inclined position, and (g) anchoring means having an upper end secured to the trailer body under the garage cover when in its closed position and adapted to extend into the ground to hold the trailer body in its garage position for preventing theft or inadvertent movement of the trailer-garage.

3. A trailer-garage for a golf buggy, comprising:
(a) a trailer body adapted to receive a golf buggy thereon,
(b) a garage cover mounted on said trailer and adapted to cover the golf buggy when it is on the trailer,
(c) pivotal connection means at the forward end of said garage cover connecting the cover to the trailer body for pivotal movement to an open position to permit entry of the golf buggy onto the rear of the trailer body underneath the garage cover,
(d) an axle pivotally mounted on said trailer body and having an offset extension on each end thereof extending rearwardly,
(e) a stub shaft on each offset extension for receiving a wheel thereon,
(f) a wheel mounted on each stub shaft,
(g) power means connected to at least one of the offset extensions for pivoting same rearwardly to raise the trailer body to the transportation position, and
(h) releasable lock means also connected to one of the offset extensions and adapted to be releasably secured to the trailer body when the body is in the transportation position.

References Cited by the Examiner
UNITED STATES PATENTS

| | | | |
|---|---|---|---|
| 2,022,375 | 11/35 | Judd. | |
| 2,389,779 | 11/45 | Heller | 214—83.26 |
| 2,753,064 | 7/56 | Lesser | 214—506 |
| 2,838,191 | 6/58 | Schramm | 214—505 |
| 2,853,745 | 9/58 | Gilsplis | 20—1.13 |
| 2,957,593 | 10/60 | Evans | 214—506 |
| 2,997,192 | 8/61 | Fortune | 214—5.5 |
| 3,012,682 | 12/61 | Williamson | 214—506 X |
| 3,044,645 | 7/62 | Smith | 214—505 |
| 3,065,871 | 11/62 | Schramm | 214—506 |

HUGO O. SCHULZ, *Primary Examiner.*
GERALD M. FORLENZA, *Examiner.*